US007028633B2

(12) United States Patent
Pinton et al.

(10) Patent No.: US 7,028,633 B2
(45) Date of Patent: Apr. 18, 2006

(54) DEVICE FOR KEEPING BIRDS AWAY WITH DIFFERENTIAL MANAGEMENT FUNCTIONS

(75) Inventors: Marco Pinton, Marghera Venezia (IT); Luciano Santarelli, Marghera Venezia (IT)

(73) Assignee: Aviotek Engineering S.r.l., Mestre (IT)

( * ) Notice: Subject to any disclaimer, the term of this patent is extended or adjusted under 35 U.S.C. 154(b) by 3 days.

(21) Appl. No.: 10/508,392

(22) PCT Filed: Dec. 24, 2003

(86) PCT No.: PCT/IT03/00854

§ 371 (c)(1),
(2), (4) Date: Dec. 28, 2004

(87) PCT Pub. No.: WO2004/064516

PCT Pub. Date: Aug. 5, 2004

(65) Prior Publication Data

US 2005/0102988 A1     May 19, 2005

(30) Foreign Application Priority Data

Jan. 23, 2003    (IT) .......................... PD2003A0011

(51) Int. Cl.
*A01M 29/02* (2006.01)
(52) U.S. Cl. .................. 116/22 A; 340/573.2
(58) Field of Classification Search ............. 340/573.2, 340/573.1, 384.2, 555, 556; 116/22 A
See application file for complete search history.

(56) References Cited

U.S. PATENT DOCUMENTS

| 4,769,794 | A | * | 9/1988 | Beuter et al. ................ 367/139 |
| 4,922,468 | A | * | 5/1990 | Menezes ...................... 367/139 |
| 5,196,823 | A | * | 3/1993 | Formigoni ............. 340/310.01 |
| 5,319,367 | A | * | 6/1994 | Schulte et al. .............. 340/961 |
| 5,450,063 | A | * | 9/1995 | Peterson et al. .......... 340/573.2 |
| 5,602,523 | A | * | 2/1997 | Turchioe et al. ......... 340/384.2 |
| 5,977,866 | A | * | 11/1999 | Joseph et al. ............. 340/384.1 |
| 6,250,255 | B1 | * | 6/2001 | Lenhardt et al. ............. 119/713 |
| 6,388,949 | B1 | * | 5/2002 | Lenhardt ..................... 367/139 |
| 6,407,670 | B1 | * | 6/2002 | Dysarsz et al. .......... 340/573.2 |
| 6,710,705 | B1 | * | 3/2004 | Smith et al. ............. 340/384.2 |

FOREIGN PATENT DOCUMENTS

| FR | 2 782 208 | | 2/2000 |
| GB | 2 284 971 A | | 6/1995 |
| JP | 02152670 A | * | 6/1990 |
| JP | 2000175612 A | | 10/2000 |

\* cited by examiner

*Primary Examiner*—R. Alexander Smith
(74) *Attorney, Agent, or Firm*—Serafini Associates

(57) ABSTRACT

A device for keeping birds away with differential management functions, comprising a control unit connected to a pilot system that controls one or more emission units. The pilot system and each emission unit comprise a casing with an optional protection cover and lifting mechanism; a control circuit; and one or more light and sound emitters. The control unit controls the light and sound emitters, receives operating instructions from the pilot system, and verifies the correct operation of all components of the unit. The control unit preferably comprises a computer with radio or wire communication capability, constantly monitors the correct operation of all pilot and emission units, sets the operating mode for each emission unit, determines and varies the sequences and combinations of the sound and light signals emitted by groups of emission units or by individual emission units, and develops the operating schedule for the entire system.

8 Claims, 4 Drawing Sheets

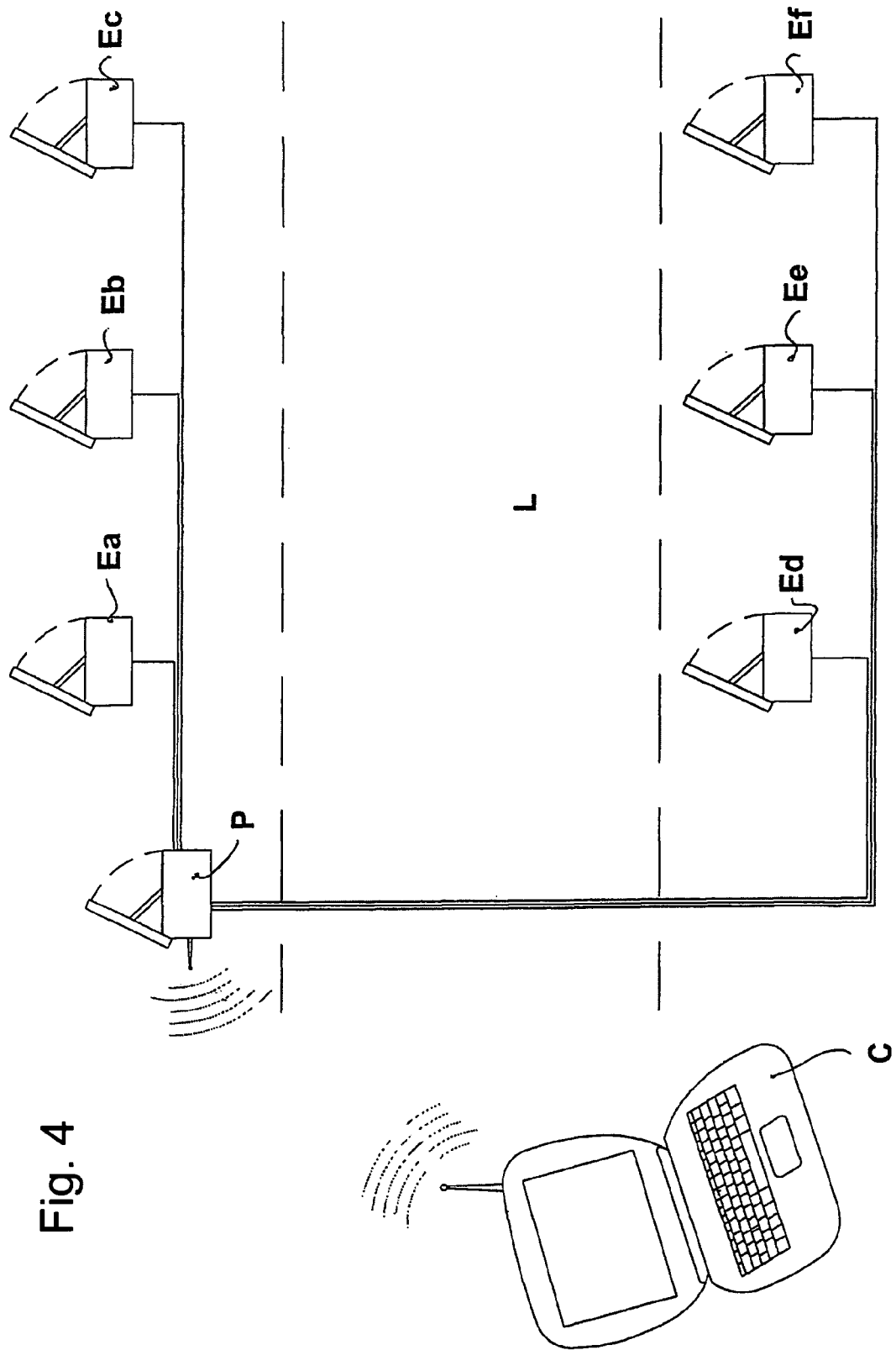

DEVICE FOR KEEPING BIRDS AWAY WITH DIFFERENTIAL MANAGEMENT FUNCTIONS

BACKGROUND OF THE INVENTION

1. Field of the Invention

This patent application concerns a signalling device, and, more specifically, a device for keeping birds away with differential management functions.

2. Description of the Related Art

Birds represent a serious problem in a variety of environments. For example, in agriculture, birds damage plants and cultivations, in fish-growing farms, birds attack the fish stock, and in airports and other surfaces to be used by airplanes, birds hinder the movement of the airplanes, especially during take-off and landing.

A device for keeping birds away is known and adopted in the prior art, and generally consists of a casing containing a pulse sound and/or light emitter.

Said device in the prior art emits sounds and/or light flashes at regular intervals and is usually positioned in the area that must be protected against birds. Such light and sound emitter operates at regular intervals that are predetermined during the production phase.

This device is not very effective, because birds memorize the time intervals between successive sound or light signals, entering the area protected by one of these devices after a signal and leaving it just before the successive one. Even if the related time interval is changed, after a while the birds memorize the new sequence, thus making the new adjustment useless.

Some devices are adjusted or manufactured to emit sound and/or light signals continuously. These devices are not very effective either, because the birds, after a lapse of time during which they get used to these signals, become insensitive to sound and light emissions.

BRIEF SUMMARY OF THE INVENTION

It is an object of the present invention is to keep birds away by means of one or more devices, positioned in the area to be protected according to a modular and integrated network, wherein light and sound signals are generated with different frequencies, amplitudes, modulations, and rhythms, and wherein the emissions at each point are determined by a control unit.

It is another objective of the present invention to keep birds away by emitting sound and light signals from different sources according to predefined, random or pseudo-random sequences.

A new device for keeping birds away with differential management functions is provided, comprising a control unit connected to a pilot system that controls and pilots one or more emission units.

Each emission unit comprises a casing that may be provided with a servo controlled, opening protection cover. Inside the casing there are a control unit, one or more light emitters and one or more sound emitters.

The control unit controls the opening of the protection cover, if provided, and the sound and light emitters. Further, the control unit receives operating instructions from the pilot system, controls the correct operation of all the components of the emission unit and sends malfunction reports to the pilot system, when necessary.

The pilot system also comprises a casing that includes an opening cover, a control circuit, one or more light emitters and one or more sound emitters. The control circuit of the pilot system, besides controlling any sound and light emitters connected to it, is provided with a device for radio or wire communication with the control unit, receiving from the control unit an operating configuration for all the emission units and transmitting the appropriate commands to each emission unit, and receiving also from each emission unit the relevant function or malfunction report and transmitting that report to the control unit.

The control unit preferably comprises a computer with a radio or wire communication system, and makes it possible to monitor the correct operation of all the pilot and emission units continuously, to set the desired operating modes for each emission unit, to determine and vary the sequences and combinations of sound and light signals for groups of emission units or for each single emission unit, and also to develop the operating schedule of the whole system.

BRIEF DESCRIPTION OF THE SEVERAL VIEWS OF THE DRAWINGS

FIG. 4 is a schematic representation of the connection of control units, pilot systems, and emission units.

DETAILED DESCRIPTION OF THE INVENTION

A detailed descriptions of an embodiment of the invention is provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1A:
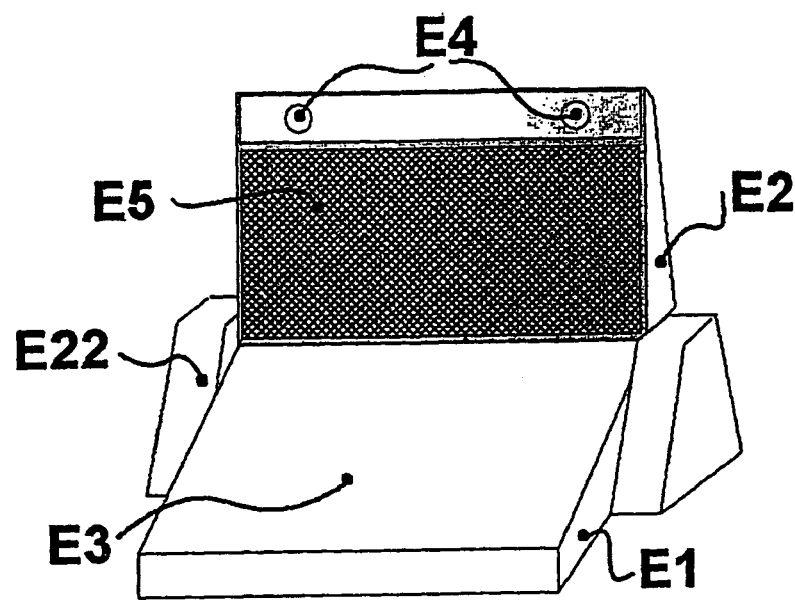
FIG. 1a is a perspective view of an emission unit with an opening cover.
Figure 1B:
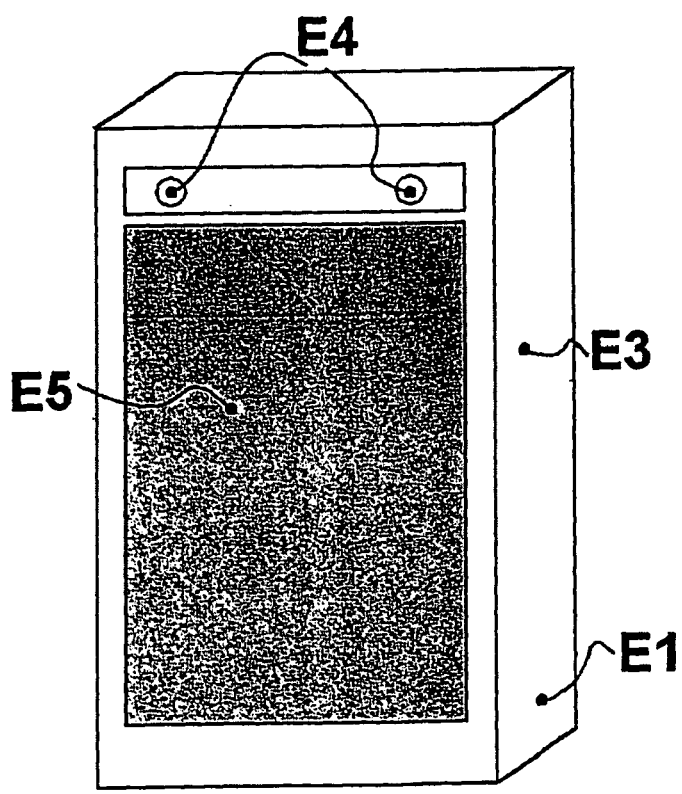
FIG. 1b is a perspective view of an emission unit without an opening cover.

Turning first to FIGS. 1a and 1b, an emission unit comprises a casing (E1) that may have a cover (E2), a control unit (E3), one or more light emitters (E4) and one or more sound emitters (E5).

The casing (E1) and the relevant cover (E2) contain the control unit (E3), as well as the sound emitters (E5) and light emitters (E4), protecting these components from the weather. In particular, the cover (E2) of the casing (E1) is totally or partially connected to a lifting mechanism (E22) that provides for the opening or closing of the cover, depending on whether the emission unit is to be protected or not from the weather.

Figure 2:
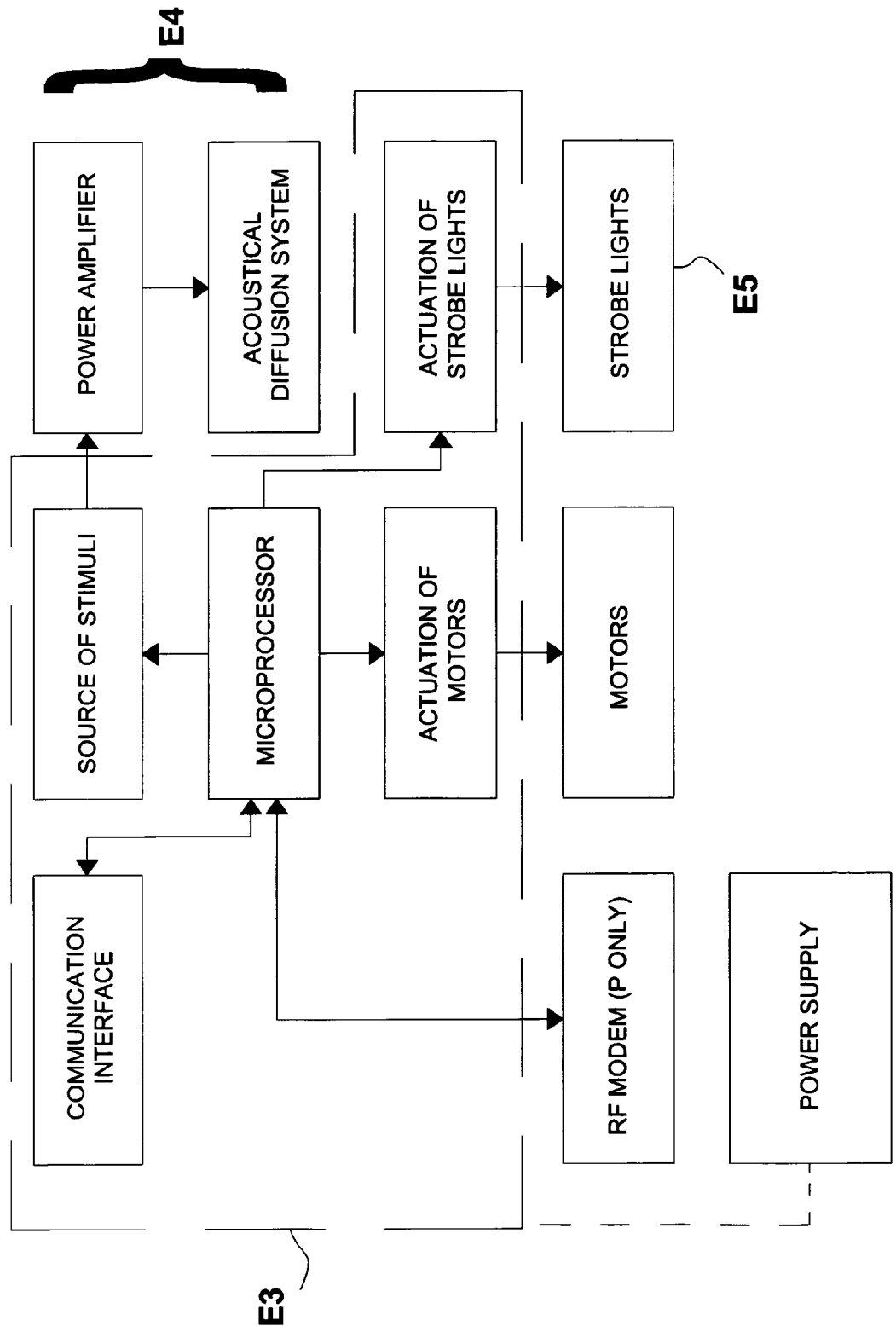
FIG. 2 is a schematic representation of an amplification unit.

Light emitters (E4) and sound emitters (E5) are preferably housed inside the cover (E2). When the cover (E2) is completely open, the light emitters (E4) and sound emitters (E5) are directed in an upward direction. Instead, when the cover (E2) is in an only partially open position, to protect the inside from the weather, the light emitters (E4) and sound emitters (E5) are directed towards a preferably reflecting surface that also protects the control unit (E3). Inside the casing (E1) there are the control unit (E3) and the amplification unit, whose connections and operation are diagrammatically represented in FIG. 2.

The light emitters (E4) are preferably constituted by one or more stroboscopic lights or similar lights inserted in the cover (E2). The sound emitters (E5) are preferably constituted by a set of loudspeakers or acoustic diffusers with high efficiency and high pass-band connected to a power amplifier. Said sound emitters (E5) are preferably inserted in the cover (E2).

The control unit (E3) comprises a logic circuit for management, self-diagnosis and communication with a pilot system (P), as well as a noise generator.

The part of the logic circuit in control unit (E3) relevant to management, self-diagnosis and communication provides for monitoring the correct operation of the entire emission unit, for transmitting the correct operation or malfunction report to the pilot system (P), for setting and operating the noise generator, for operating the light emitters (E4) and sound emitters (E5) and the cover (E2) lifting mechanism (E22).

Figure 3:
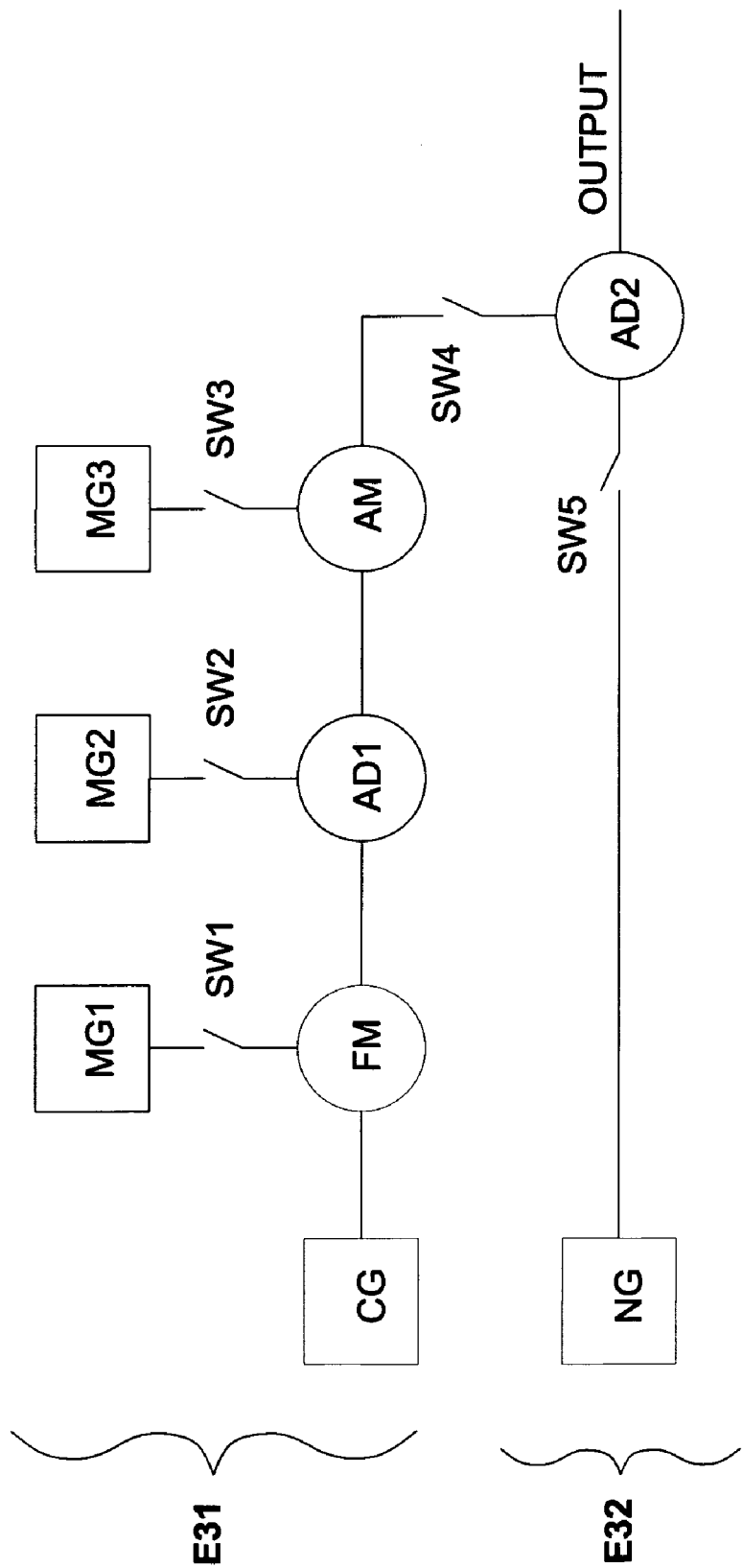
FIG. 3 is a schematic representation of part of a control circuit for noise generation.

The part of the control unit (E3) related to the noise generator, diagrammatically represented in FIG. 3, substantially comprises a first device (E31) for generating variously modulated wave forms, which can be emitted in predefined manner, such as at random or in a predetermined manner, for example through a complex algorithm, and a second device (E32) for generating predetermined sounds, for example blasts, explosions, howls, or bursts. Said two modules (E31, E32), are capable of producing signals with different types of modulation in a wide spectrum of audible and ultrasonic frequencies with emission level variations, both at random and piloted.

The first and second devices (E31, E32) can be used separately or together, by means of an apposite adder (AD2) and the relevant switches (SW4, SW5), for the production of more or less complex noise effects. The related signals are sent to a suitable power amplifier that is in turn connected to the sound emitters (E5).

The wave form generator (E31) comprises a frequency modulator (FM) followed by an adder (AD1) and by an amplitude modulator (AM). The three stages are powered by as many generators of modulating frequencies (MG1, MG2 and MG3) and by a carrier frequency generator (CG). The frequency and amplitude of each generator (MG1, MG2 and MG3) are variable within predefined limits and are piloted at random or in a predetermined manner, depending on the desired sound effect. It is possible to exclude one or more generators (MG1, MG2 and MG3) by means of apposite switches (SW1, SW2, SW3), in order to obtain different signal combinations.

The carrier (CG) and modulating frequency (MG1, MG2, MG3) generators are all of the frequency synthesis type and both their frequency and amplitude can be modified through the control unit (E3).

The above described emission unit is connected to the pilot system (P). The pilot system (P) is built in similar fashion to an emission unit and comprises a casing with or without an opening cover, a control circuit, an amplification unit, one or more light emitters and one or more sound emitters. Besides, pilot system (P) is provided with suitable interfaces for connection to the various emission units and with a radio connection module for connection to a control unit (C).

The various control units (C), pilot systems (P) and emission units (E) are connected to one another as diagrammatically shown in FIG. 4 to protect an area (L), for example the strip of an airport.

The pilot system (P) substantially receives from the control unit (C) the operating configuration of all the emission units (in FIG. 4, emission units Ea–Ef), sends the relevant commands to each emission unit (Ea–Ef), and also receives from each emission unit (Ea–Ef) the relevant correct operation or malfunction report transmitting it to the control unit (C).

The control unit (C) preferably comprises a computer, with wire or radio communication system for connection to the pilot system (P), together with dedicated software.

The control unit (C) makes it possible to constantly monitor the correct operation of all the pilot systems (P) and emission units, to set the operating mode for each emission unit through a program capable of activating the light emitters (E4) and sound emitters (E5), as well as of defining the sequences and combinations of sound and light signals for groups of emission units or for single emission units, whether in a predetermined, pseudo-random, or random manner.

The operation of the new device for keeping birds away with differential management functions requires that both the emission units (Ea–Ef) and each pilot system (P) have the possibility to operate individually or to be coordinated. In both cases management is carried out by the pilot system (P), duly piloted by the control unit (C). In each case the time schedule and the characteristics of the sound and light signals will be determined by the pilot system (P) in combination, wherein the combination is predetermined, pseudo-random, or random. For example, it will be possible to obtain the emission of independent random signals from each emission unit, wherein each unit will emit a different random signal, or of random signals depending on the pilot system (P), wherein all emission units will emit the same random signal.

The emission units can emit different or identical sounds in different sequences (linear sequence, alternate sequence, chessboard sequence, etc.). For example, in the case of six emission units (Ea–Ef), some of the possible sequences may be the following:

Ea, Ed, Eb, Ee, Ec, Ef;
Ea Ee Ec together, Ed Eb Ef together;
Ea, Eb, Ec, Ef, Ee, Ed;
Ea Eb Ec together, Ed Ee Ef together;
Ea, Eb, Ec, Ed, Ee, Ef;
Ea Eb Ec Ed Ee Ef together;
Ea Ed together, Eb Ee together, Ec Ef together.

The beginning, the duration, and the sound characteristics of each stage of a sequence can be varied by the pilot system (P) in a random, pseudo-random or predetermined manner.

Even when the operation of the emission units is completely independent and randomized, it is possible to still set some parameters, such as a combination of parameters, for example the range of carrier and modulating frequencies emitted, the maximum and minimum duration of each stage, or the minimum and maximum amplitude of each signal.

It is also possible to provide for the operation of subgroups of emission units (Ea–Ef) according to specific areas to be covered: for example Ec and Ef may operate independently and at random, while Ea, Eb, Ed and Ee may be activated in a piloted manner.

The new device for keeping birds away with differential management functions offers considerable advantages over the prior art.

There are no fixed time and/or frequency intervals between the emission of sound and/or light signals, and therefore the birds cannot know in advance when a given signal is going to start and/or to end.

There are no continuous acoustic signals and/or flashes that allow the birds to become accustomed to these types of signals.

Operating times, emitted frequencies, and synchronization, succession or independence among the various units makes the sound and/or light emissions of the set of emission units completely unpredictable, which prevents the birds from memorizing the operating times and sequences of the various emission units.

The operation of each emission unit in the self-diagnosis mode and the consequent report on its operating condition to the control unit (C) through the pilot system (P) make it possible to constantly verify the correct operation of all the emission units, thus allowing also the necessary maintenance operations and repairs to be carried out on the emission units that may be functioning incorrectly and on the specific malfunctioning devices.

While the invention has been described in connection with the above described embodiment, it is not intended to limit the scope of the invention to the particular forms set forth, but on the contrary, it is intended to cover such alternatives, modifications, and equivalents as may be included within the scope of the invention.

The invention claimed is:

1. A device for keeping birds away comprising:
   a control unit (C); and
   one or more emission units (E) connected to the control unit (C) and emitting sound and light signals,
   wherein each of the one or more emission units (E) comprises a casing (E1) that contains a control circuit (E3), light emitters (E4) that emit the light signals, and sound emitters (E5) that emit the sound signals,
   wherein the one or more emission units (E) are structured to operate independently from the presence of birds and from each other, and
   wherein the control unit sets operating parameters, modes, and sequences for each of the one or more emission units, and
   wherein the operating parameters, modes, and sequences cause the one or more emission units to generate the sound and light signals with varying frequencies, amplitudes, modulations, rhythms, and time intervals.

2. The device for keeping birds away according to claim 1, wherein the casing (E1) of each of the one or more emission units (E) is provided with a cover (E2), and wherein the cover (E2) is opened and closed through a mechanism controlled by the control circuit (E3).

3. The device for keeping birds away of claim 2, wherein the mechanism is a lifting mechanism.

4. The device for keeping birds away of claim 1, further comprising a pilot system (P) connected to all of the one or more emission units (E), wherein the control unit (C) transmits the operating parameters, modes, and sequences to the pilot system (P), and wherein the pilot system (P) transmits to each of the one or more emission units (E) the frequencies, amplitudes, modulations, rhythms, and time intervals.

5. The device for keeping birds away according to claim 4, wherein the control unit (C) controls the one or more emission units (E) through the pilot system (P) and through a program capable of activating at least one of the sound emitters (ES) and the light emitters (E4) in a predetermined, pseudo-random, or random manner, and wherein the one or more emission units (E) are controlled by the control unit (C) in a predetermined, pseudo-random, or random combination.

6. The device for keeping birds away according to claim 5, wherein the control circuit (E3) comprises a first device for generating wave forms (E31) and a second device for generating predetermined sounds (E32), the first and second devices being suitable to be used independently of each other.

7. The device for keeping birds away according to claim 6, wherein the first device (E31) comprises a frequency modulator (FM) followed by an adder (ADI) and by an amplitude modulator (AM), wherein the first device is powered by a plurality of generators of modulating frequencies (MG1, MG2, MG3) and by a generator of carrier frequency (CG), and wherein the frequency and amplitude of each generator of modulating frequencies (MG1, MG2, MG3) are variable within predefined limits and are piloted by the control circuit (E3).

8. The device for keeping birds away according to claim 4, wherein the control circuit (E3) of each of the one or more emission units (E) constantly monitors the operating conditions of components parts of each of the one or more emission units (E) sending a related report to the pilot system (P), and wherein the pilot system (P) sends all of the related reports to the control unit (C).

* * * * *